Jan. 27, 1925.
H. D. FLEGEL
JUICE EXTRACTOR
Filed May 26, 1924 — 2 Sheets-Sheet 1
1,524,091
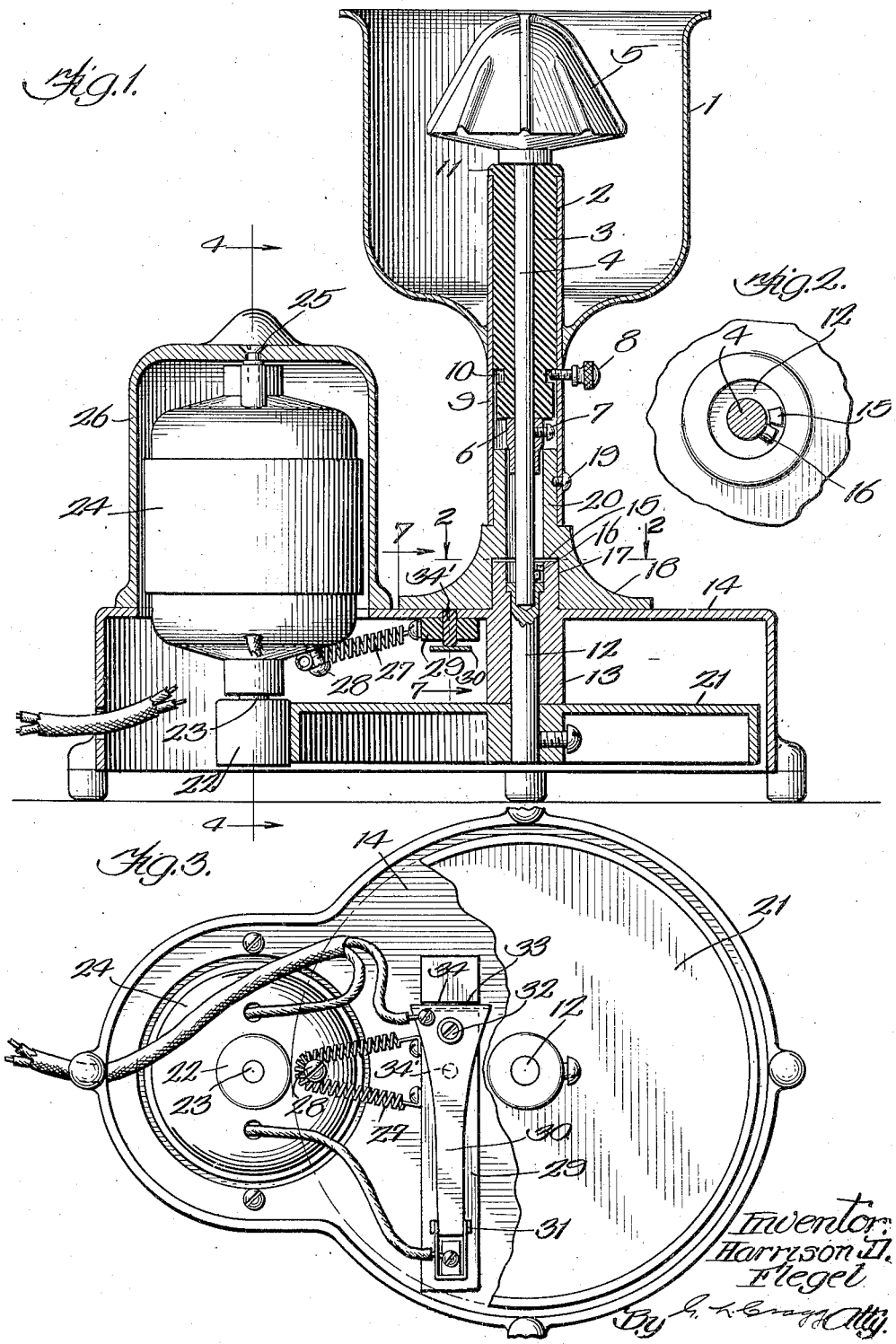

Jan. 27, 1925.  
H. D. FLEGEL  
JUICE EXTRACTOR  
Filed May 26, 1924   2 Sheets-Sheet 2
1,524,091
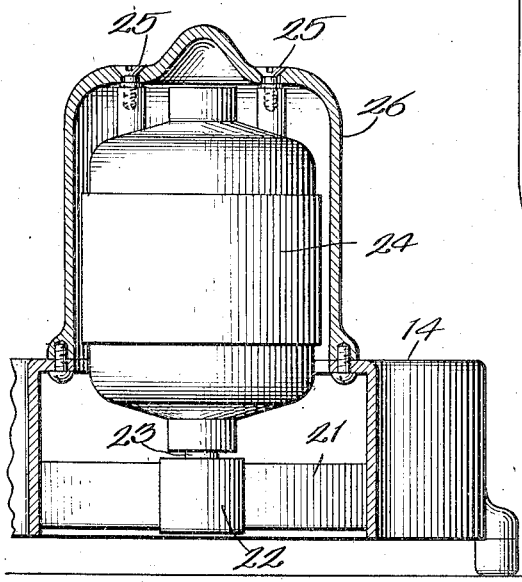
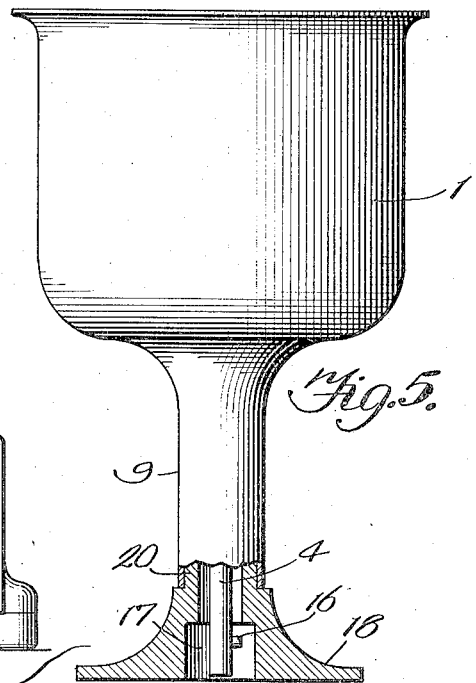
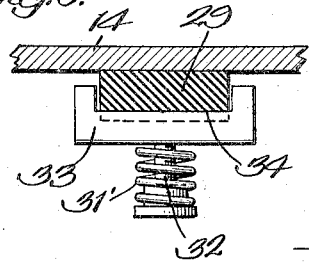
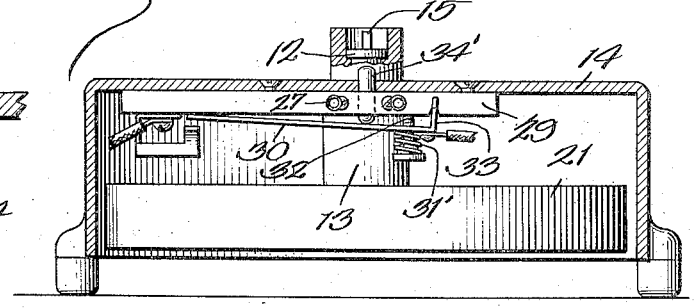
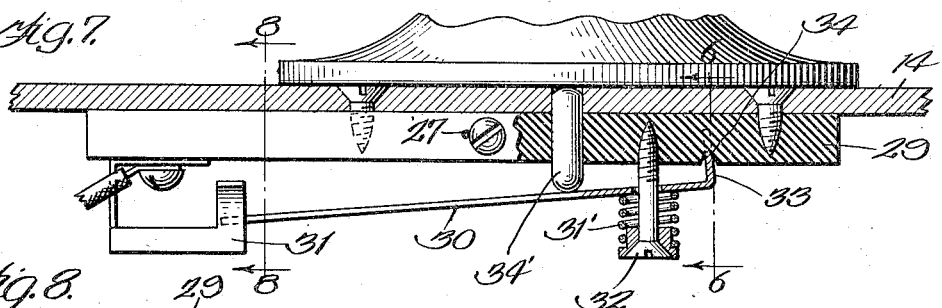
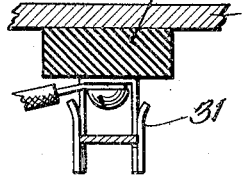
Inventor:  
Harrison D. Flegel Patented Jan. 27, 1925.

1,524,091

UNITED STATES PATENT OFFICE.

HARRISON D. FLEGEL, OF RACINE, WISCONSIN, ASSIGNOR TO ARNOLD ELECTRIC COMPANY, OF RACINE, WISCONSIN, A CORPORATION OF WISCONSIN.

JUICE EXTRACTOR.

Application filed May 26, 1924. Serial No. 716,012.

*To all whom it may concern:*

Be it known that I, HARRISON D. FLEGEL, a citizen of the United States, residing at Racine, in the county of Racine and the State of Wisconsin, have invented a certain new and useful Improvement in Juice Extractors, of which the following is a full, clear, concise, and exact description.

My invention relates to those juice extractors which employ rotatable bulbs within receivers or otherwise above the bottoms thereof and that receive the juice after its extraction and employing rotatable shafts passing through the bottoms of the containers.

The invention has for one of its objects the provision of a construction whereby the receivers may be in the form of cups to hold the extracted juice. In carrying out this object of the invention, the bottom of the cup is upwardly continued to form a sleeve which surrounds the shaft which carries or is otherwise in driving relation to the bulb, the sleeve and cup being substantially imperforate in the zone common to both cup and sleeve.

The structure of my invention desirably also includes power transmitting means having separable connection with the shaft that drives the bulb and beneath the cup or container whereby the container may be readily and frequently removed for the purpose of cleaning it and also for discharging its contents, if the container is in the form of a cup requiring its inversion to empty it. This feature of my invention is also of service to enable the removal or change in position of the container, whether it is in the form of cup or not, for the purpose of cleaning. While the power transmitting mechanism is preferably formed in separable sections, as stated, the invention is not to be thus limited.

The bulb may be operated by hand, if desired, but when it is to be frequently used, as at soda fountains, it is preferably operated by a motor. When a motor is employed, I desirably control the energy that operates the motor through the agency of the cup or container to effect the flow of the motor operating energy to the motor, either by virtue of the position of the cup or container when in place, or by downward pressure manually exerted upon the cup or container. In the preferred embodiment of the invention, the motor employed is an electric motor whose circuit is governed by a circuit controlling switch through the agency of the cup or container, as specified. This switch may be adjusted so that it will be operated to close the motor circuit through the agency of the cup or container in place, but, if preferred, the switch may be adjusted to require additional hand pressure upon the cup or container to close the switch.

The invention will be more fully explained in connection with the accompanying drawing in which Fig. 1 is a sectional elevation of the preferred embodiment thereof; Fig. 2 is a detail on line 2—2 of Fig. 1; Fig. 3 is a bottom view; Fig. 4 is a sectional view of part of the apparatus on line 4—4 of Fig. 1; Fig. 5 is a side view of the cup with the lower end of the stem portion thereof in section to reveal the shaft that is in driving relation with the bulb; Fig. 6 is a sectional view on line 6—6 of Fig. 7; Fig. 7 is a view partially taken on line 7—7 of Fig. 1 and partially in elevation; and Fig. 8 is a view on line 8—8 of Fig. 7. The receptacle or receiver 1 is preferably in the shape of a cup whose bottom is upwardly continued to form a sleeve 2, the cup and sleeve being imperforate in the zone common thereto whereby the juice which is extracted may be accumulated within the cup which is desirably continued above the sleeve. A bearing 3 is disposed within the sleeve to receive the shaft 4 that may be turned therein. The bulb 5, upon which the fruit, such as an orange or a lemon, is to be placed in the juice extracting operation, is suitably secured upon the upper end of the shaft. The base of the bulb abuts against the upper end of the bearing. A collar 6 is clamped upon the shaft by a set-screw 7, this collar and the bulb cooperating to hold the bearing in assembly with the shaft so that the unit comprising the bulb, shaft and sleeve may be removed and reinserted without disturbing the assembly of these elements. A locking device is employed to confine the bulb, shaft and bearing sleeve to a fixed zone with respect to the cup, this locking device being preferably in the form of a set-screw 8 which is screwed through the sleeve 9 which constitutes the downward continuation of the cup, the inner end of this screw being received within an annular groove 10 formed in the bearing 3. The juice may be received in the cup up nearly to its brim as the bearing preferably has a flange 11 engaging the upper end of the sleeve 2 to close the sleeve against the passage of the juice therethrough. Whenever it is desired to remove the unit comprising the bulb, shaft and bearing, the screw 8 is loosened sufficiently to withdraw its inner end from the channel 10.

The shaft 4 may be driven by a shaft 12 journaled in a bearing 13 which is provided upon the supporting base 14 for the entire apparatus. The shafts 12 and 4 are desirably co-axial, the adjacent ends of these shafts carrying separably engaged coupling elements 15 and 16 which are disposed within a cylindrical recess 17 which is formed in the bottom of the flange 18 upon the lower end of the sleeve 9, this flange being desirably separately formed from the sleeve end and secured thereto by means of a binding screw 19 passing through this sleeve into threaded connection with the upper tubular extension 20 of the flange. The coupling members 15 and 16 are brought into a common zone when the cup is in its lowermost position with the flange 18 upon the top of the base 14. The cup may be readily lifted without adjusting any parts and may be rested upon any other support than the base 14 on which the shaft 4 terminates slightly above the bottom face of the flange 18 so that this shaft will not mar the support upon which the cup is temporarily placed.

If the shaft 12 is to be turned by a motor, it is preferably provided with a friction wheel 21 which may be engaged by a friction pinion 22 that is carried directly upon the shaft 23 of an electric motor 24. The motor 24 is assembled with the base 14 preferably by means of the two screws 25 that are passed downwardly through the top wall of the upward extension 26 of said base, these screws permitting slight swinging movement of the motor. A coiled spring 27 is looped about the screw 28 carried upon the bottom of the motor, the ends of this spring being secured to an insulating strip 29 screwed to the top of the hollow base 14 and located within the base. The spring 27 pulls upon the motor in a direction to maintain the pinion 22 in driving frictional engagement with the wheel 21. The circuit of the motor is opened and closed by means of a switch including a switch arm 30 and a bifurcated contact 31 between and against the branches of which said switch arm is pressed when the switch is to be closed. A coiled spring 31' serves to disengage the switch arm 30 from its complemental contact 31 when the switch closing pressure upon said switch arm is removed. As illustrated, an assembling screw 32 passes through the bore of the spring 31' into the insulating support 29. The switch arm 30 is also penetrated by the screw 32 and is further assembled with the support 29 by having its non-contacting end bent at an angle as indicated at 33 and formed with a groove to receive the support 29 that itself is formed with a groove 34 to receive the adjacent portion of the switch arm.

The switch closing pressure upon the switch arm 30 is desirably effected through the intermediation of an upright insulating plunger 34' passing through the support 29 and the top wall of the base 14 into position to be engaged by the flange or bottom 18 of the cup when this cup is so placed upon the base 14 as to bring the shaft 4 into connection with the shaft 12. The spring 31' may be so adjusted by the screw 32 as to enable the weight of the cup and the parts carried thereby alone to depress the plunger 34' sufficiently to close the switch arm or the adjustment of the spring 31' may be such as to require additional downward pressure exerted upon the cup by hand.

Changes may be made without departing from my invention.

Having thus described my invention, I claim:

1. A juice extractor including a receiver for receiving the extracted juice; a rotatable bulb above the receiver bottom; a base for supporting the receiver; and power transmitting means passing through the base and into the receiver and having driving connection with the bulb, this power transmitting means including a coupling permitting the removal of the receiver from the base.

2. A juice extractor including a receiver for receiving the extracted juice; a rotatable bulb located above the bottom of the receiver; a base upon which the receiver is movably placed; a motor for rotating the bulb and in driving connection therewith for this purpose; and means for controlling the supply of energy that operates the motor and, in turn, controlled by the receiver.

3. A juice extractor including a receiver for receiving the extracted juice; a rotatable bulb located above the bottom of the receiver; a base upon which the receiver is movably placed; an electric motor for rotating the bulb and in driving connection therewith for this purpose; and a switch controlling the circuit of the motor and, in turn, governed by the receiver and positioned to be closed by the receiver when the receiver is resting upon said base.

4. A juice extractor including a receiver for receiving the extracted juice; a rotatable bulb located above the bottom of the receiver; a base upon which the receiver is movably placed; an electric motor for rotating the bulb and in driving connection therewith for this purpose; a switch controlling the circuit of the motor and, in turn, governed by the receiver and positioned to be closed by the receiver when the receiver is resting upon said base; and means for adjusting the switch to require a pressure upon the receiver to close the switch.

5. A juice extractor including a receiver for receiving the extracted juice; a rotatable bulb above the receiver bottom and journaled in the receiver; a base for supporting the receiver; and power transmitting means passing through the base and into the receiver and having driving connection with the bulb, said power transmitting means being formed to permit change in position of the receiver with respect to the base.

In witness whereof, I hereunto subscribe my name.

HARRISON D. FLEGEL.